Feb. 26, 1957 R. E. SEMPLE 2,783,361
WELDING PROCESS AND APPARATUS
Original Filed July 31, 1952 4 Sheets-Sheet 4
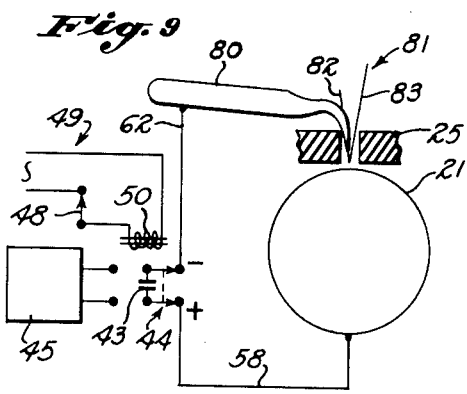
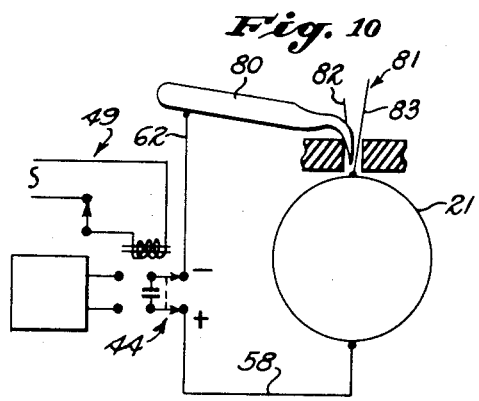
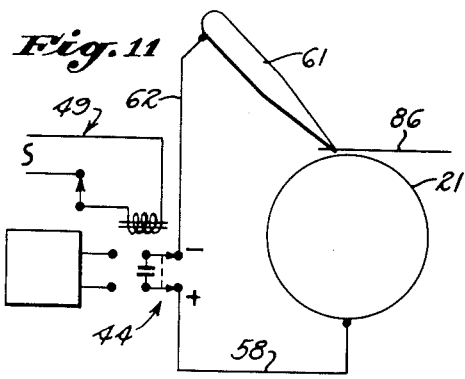
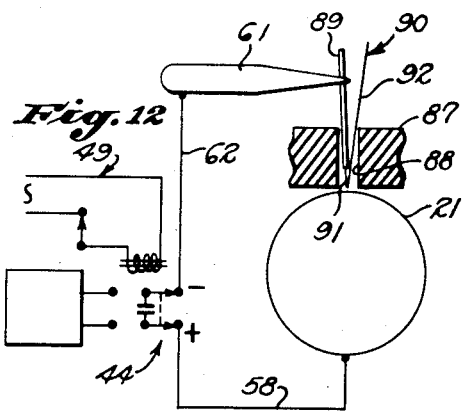
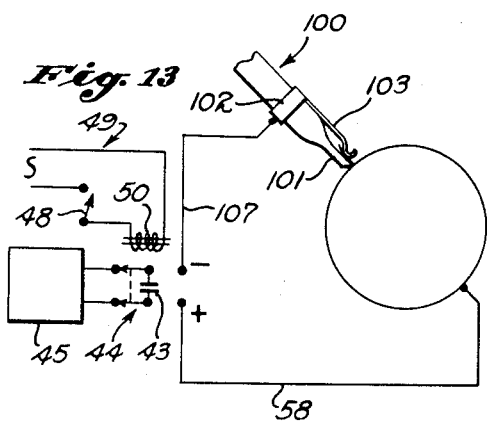
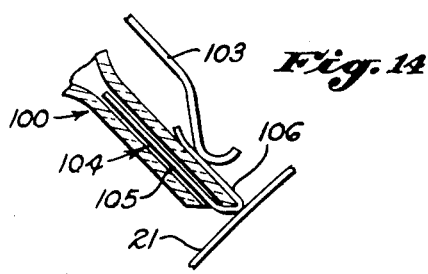
INVENTOR:
ROBERT E. SEMPLE
BY HIS ATTORNEYS
HARRIS, KIECH, FOSTER & HARRIS

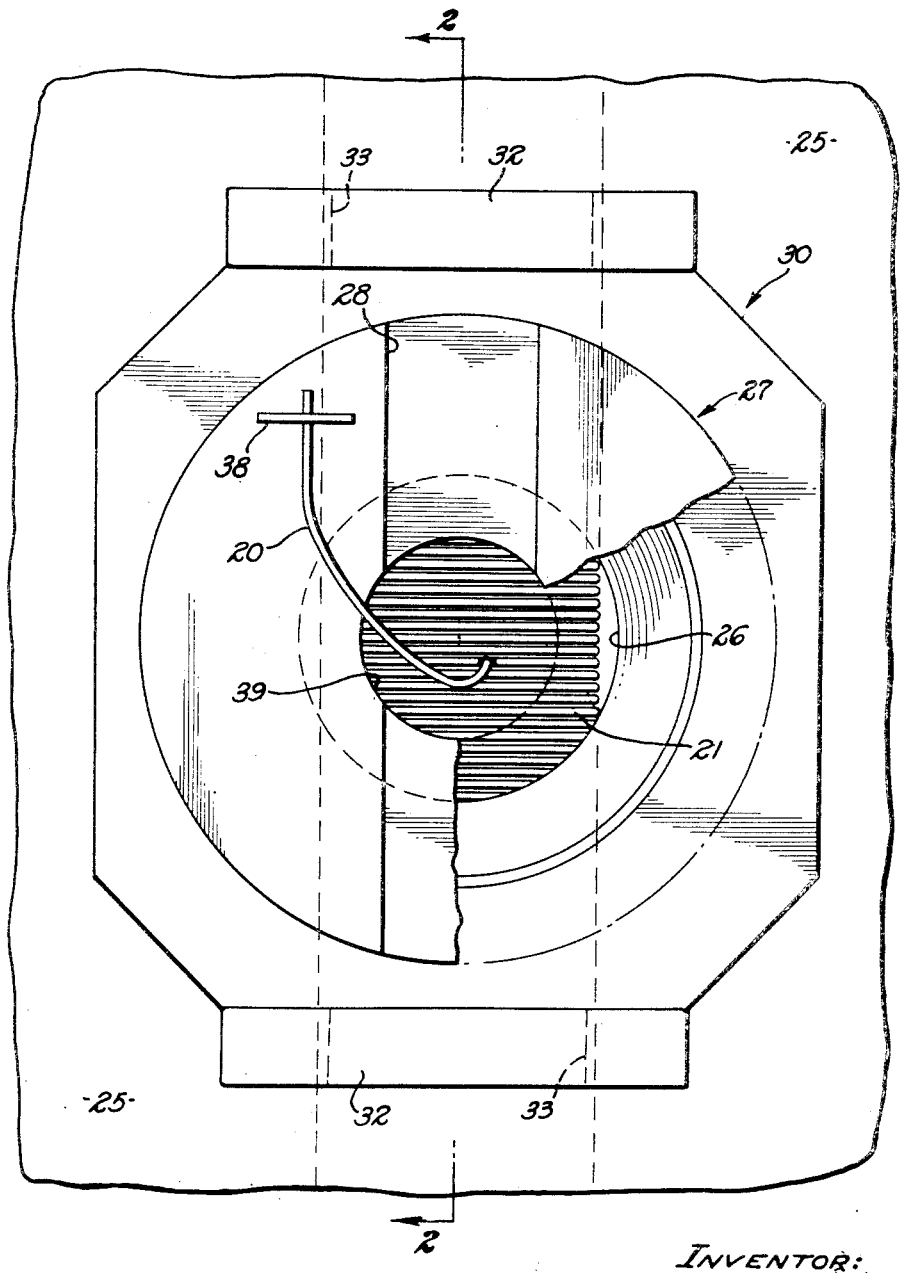

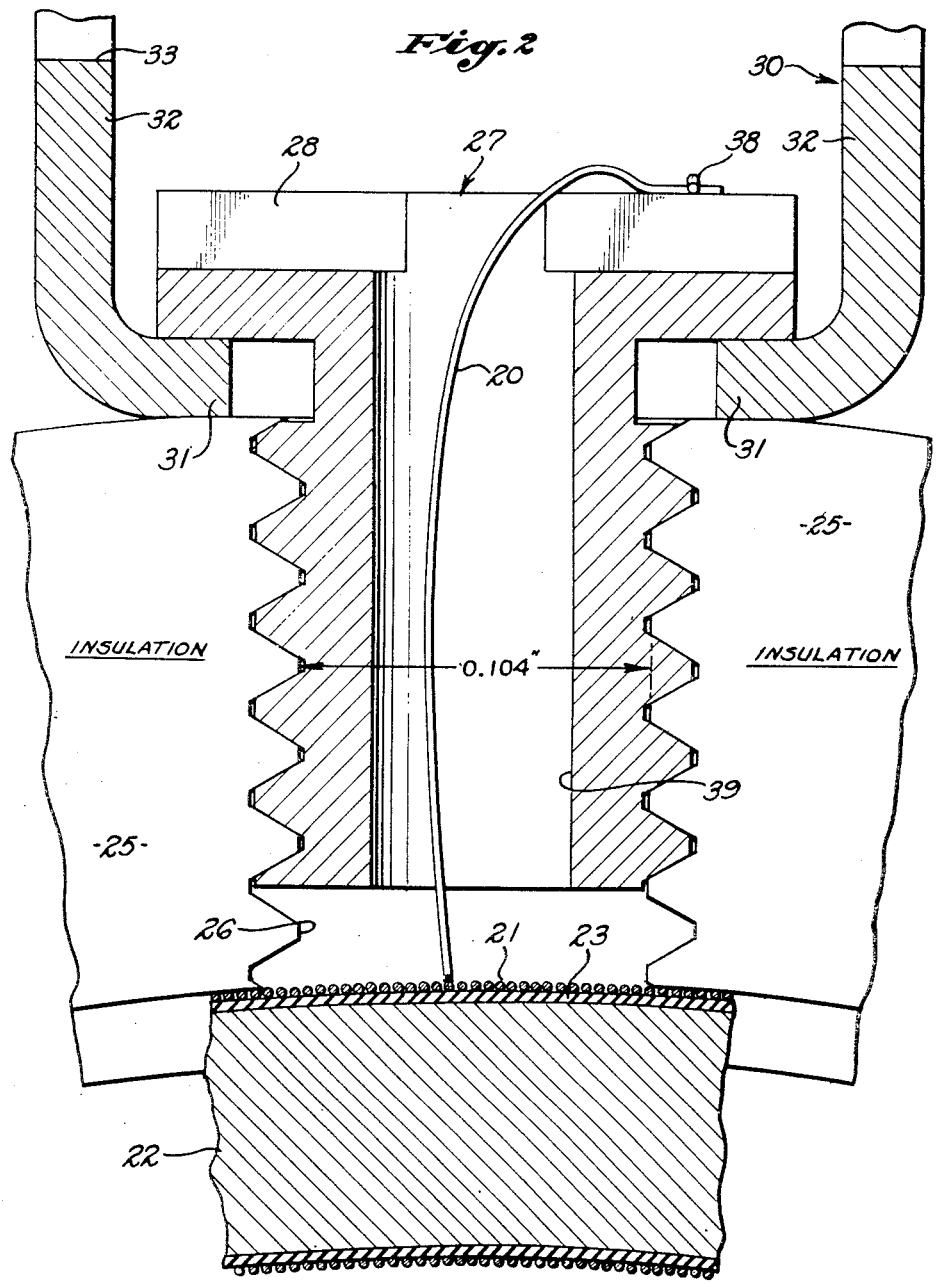

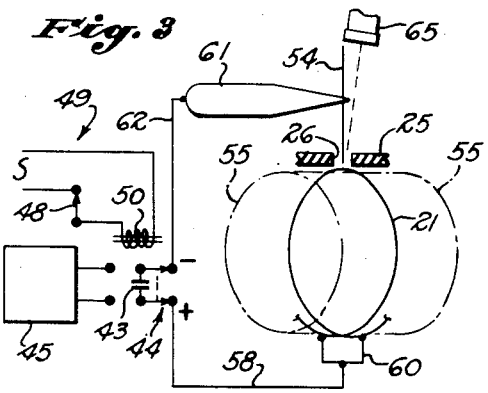
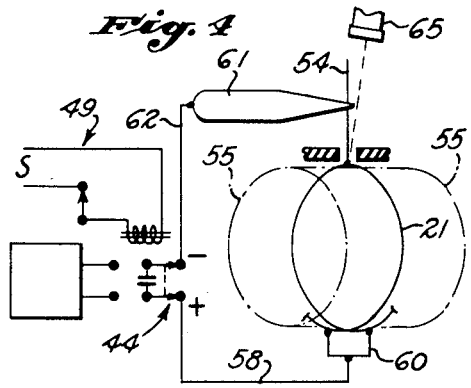
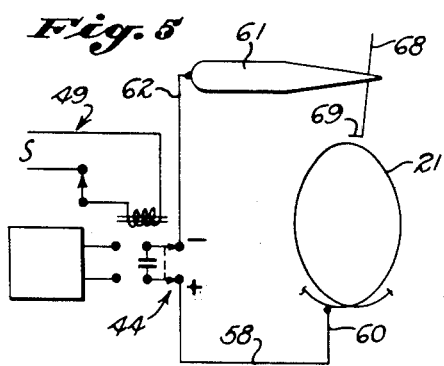
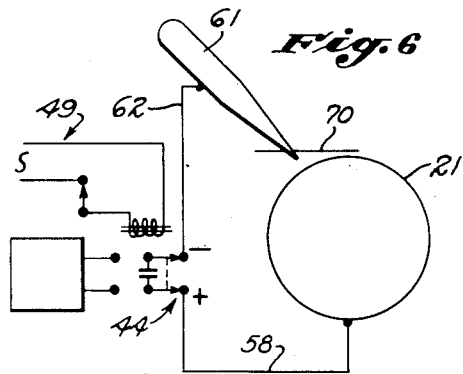
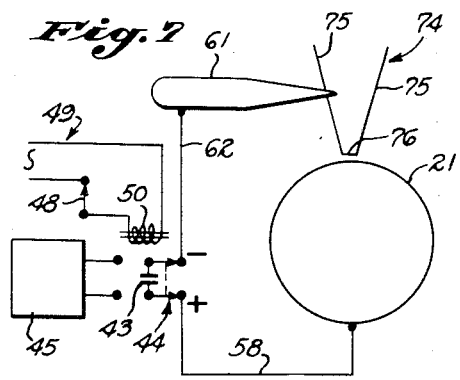
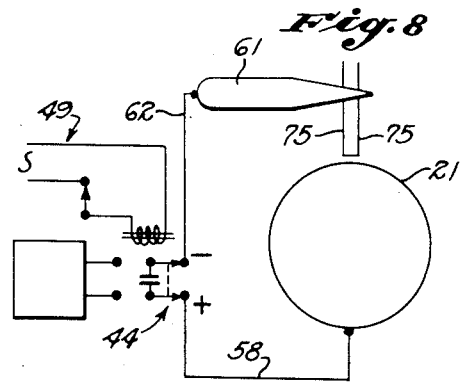

United States Patent Office 2,783,361
Patented Feb. 26, 1957

2,783,361

WELDING PROCESS AND APPARATUS

Robert E. Semple, Temple City, Calif., assignor to Beckman Instruments, Inc., Fullerton, Calif., a corporation of California Original application July 31, 1952, Serial No. 302,023, now Patent No. 2,710,328, dated June 7, 1955. Divided and this application April 7, 1955, Serial No. 499,789

6 Claims. (Cl. 219—107)

This invention relates to welding methods and apparatus, more particularly resistance welding, and is directed specifically to the problem of welding together exceedingly small metal filaments or wires. The method is applied to filaments smaller in thickness than .50 inch, preferably thinner than .025 inch, and has special utility for welding filaments less than .015 inch in thickness.

While the invention is broadly applicable to the bonding of relatively small filaments and wires, it is being initially applied to the welding of tap connections for fine wire potentiometers. Such a practice of the invention will be described herein for the purpose of disclosure and to provide adequate guidance for those skilled in the art who may have occasion to apply the same teachings to other specific purposes.

A rotary potentiometer of the type under consideration consists of a resistance wire, less than .015 inch diameter, wound helically on a suitable coated core, which core, for example, may be a metal wire of 0.15 inch diameter formed into a ring or helical coil. The helically wound core is mounted in a suitable cylindrical casing in which is journalled a rotary wiper that moves across the turns of the helically wound resistance wire.

It will be readily appreciated that the problem of making a tap connection to an intermediate turn of the helically wound resistance wire is difficult as well as exceedingly tedious because such fine wires are easily damaged by heat application and because the wires are difficult to see and handle. Usually a microscope is required. The task of making a tap connection is even more difficult when the tap must be made after the helically wound core is mounted in its cylindrical casing and the helical winding is accessible only through a peripheral casing hole substantially less than 1/10 inch in diameter.

One technique heretofore employed for making tap connections to a helical winding of such a potentiometer consists in cutting a helical turn at a point on the core 180° away from the desired tap point and then unwinding each of the two cut ends by half a turn and soldering or otherwise bonding the two cut ends to a suitable terminal member or lug. The most serious disadvantage of this procedure is the sacrifice of one turn of the helical resistance. The gap of one turn introduces a discrepancy that must be taken into consideration in any situation where the effective resistance of the potentiometer is intended to vary directly with movement of the wiper throughout the range of potentiometer operation.

Later, what may be termed a pressure welding technique was developed for the direct welding of a tap wire to a turn of a helically wound resistance wire without the necessity of cutting the turn or disturbing the position of the turn on the core. This later process is carried out by means of a glass tube that is reduced to capillary size at its operating end and is provided with a suitable external conductor positioned a short distance from its operating end. The tap wire that is to be attached to a turn of the helical resistance wire is bent to the shape of a V with one leg of the V extending into the operating end of the glass tube and the other leg suitably held along the outside of the tube in contact with the external conductor. In preparation for the weld, the selected helical turn of the resistance wire is suitably cleaned at the desired tap point and one side of suitable electric welding apparatus is connected to the helical resistance wire in the region of the desired tap point. Such a connection may be made through the medium of the rotary wiper of the potentiometer or by equivalent contact means incorporated in a suitable welding jig. The other side of the electrical welding apparatus is connected with the conductor fitting on the glass tube.

The welding operation involves the discharge of a capacitor but before the capacitor is charged or at least before the discharge circuit is closed, the apex of the bent tap wire is pressed against the selected turn of the helical resistance wire by the operating end of the capillary tube and, while the tap wire is thus sandwiched under substantial sustained pressure between the glass tube and the fixed helical turn, the capacitor is discharged. The resulting surge of current burns away the short length of tap wire between the point of sustained pressure and the conductor fitting on the glass tube and causes melting of the metal at the pressure point to a sufficient extent to permit the tap wire to be pressed into fusion with the helical turn of the resistance wire. The length of wire in the glass tube comprising one leg of the preliminary wire V thus becomes the permanent tap wire.

For a number of reasons, the described welding procedure is unduly tedious and time consuming. To carry out the welding procedure effectively it is necessary to grind the end of the capillary glass tube to a relatively sharp bevel and this grinding operation must be performed every time the end of the glass tube breaks and also when a new tube is used. The necessary application of pressure at the weld point often breaks the glass tube and the repeated heating of the end of the tube tends to cause the glass to chip. Usually the supply of wire used for successive tapping operations is fed through the capillary tube to avoid the necessity of rethreading the wire into the tube for each welding operation but rethreading becomes necessary as often as the wire escapes from the glass tube and, of course, whenever a glass tube is replaced. These disadvantages could be greatly reduced by omitting the application of pressure at the weld point.

A further reason for the described welding procedure being tedious and time consuming is that many of the welding operations must be performed through a peripheral hole in the potentiometer casing, as heretofore stated, such a casing hole, for example, being of the order of .070 inch in diameter and the depth of the hole or thickness of the casing wall being as much as 5/16 inch. Even the smallest practical capillary glass tube is large in diameter relative to such a casing hole and it is difficult to handle a fine wire in the hole without interfering with the operator's line of sight.

It may be readily appreciated that working with such fine wire under such handicaps is a strain even on operators with excellent eyesight and steady nerves. Morale and employee turnover become problems when operators weld one tap connection after another all day for quantity production.

With reference to the finished product, however, the most serious disadvantage of this prior welding technique is that it necessarily limits the diameter of the tap wire to two or three sizes smaller than the resistance wire to which the tap wire is welded. It may be readily appreciated that this necessary resort to undersized tap wires results in increased resistance commonly termed "end coil" resistance which is a limiting factor in the corresponding potentiometer corcuit and an important consideration in all uses of the potentiometer in high precision devices.

It is essential, above all, to avoid damaging that portion of the helically wound resistance wire that is included in the welding circuit by any imposition of a welding current beyond the power rating of the resistance wire. Overloading is avoided by the two expedients of employing an undersized tap wire and by the application of pressure at the weld point to reduce the contact resistance at the weld point to the lowest possible value. With minimizing the welding current to avoid overloading the resistance wire, it is almost impossible to melt the metal of the two wires without applying preliminary pressure to reduce local resistance and without following through with upset pressure to complete the weld. A further reason for employing a relatively small tap wire is that heat is dissipated by contact of the wire with the glass tube at the welding zone. This heat loss reduces the heat available for welding below the quantity required for a full size tap wire.

One primary object of the present invention is to make it possible to weld larger tap wires to potentiometer resistors with corresponding reduction in the end coil resistance at each tap connection. It is another object of the invention to provide a welding procedure that is less of a strain on the operator and less fatiguing with consequent betterment of employee morale and turnover. Another object is to simplify the welding operation and to minimize the equipment necessary to carry out the welding operation. A still further object intimately related to the foregoing objects is to reduce the labor cost of making tap welds and to speed the operation for quantity production.

In general, the attainment of these various objects of the invention is based on the discovery of what may be termed a "bridging" effect of a spark and the further discovery that by virtue of this effect, the application of pressure to consummate a weld becomes unnecessary. In the prior art resistance welding methods, including the welding technique described above, care must be taken to bring the parts together with sufficient pressure to upset the metal at the weld. In flash welding special clamps are used to hold the two parts to be welded and to move the parts together while the metal is molten.

In percussion welding, which relies on an arc for heating the metal instead of relying on the resistance in the metal, the two parts to be joined are connected to a stored energy source and then are snapped together by heavy spring pressure. When the rapidly closing gap between the two workpieces narrows to, say, approximately 1/16 inch, there is a sudden arc discharge across the gap that brings the metal at the two opposed surfaces to high temperature. The arc is extinguished by the percussion blow as the parts come together and the pressure of impact causes the two metals to fuse together. In the electrostatic method of percussion welding, the energy is stored in a capacitor and the parts to be welded are heated by the sudden discharge of heavy current from the capacitor.

In flash welding and in percussion welding, the follow-up contact and high mutual pressure of the parts are indispensable. It has been discovered, however, that when an arc, such as is generated in flash welding and percussion welding, is generated across a gap between two metal filaments that are exceedingly small, the result is a displacement of metal and apparently a migration of metal particles to form a bridge between the two filaments. In other words, the two filaments may be bonded together by movement of metal across the gap to bridge the gap instead of by uniform bodily movement of the two filaments relative to each other to close the gap. Fortuitously, the amount of heat that can be generated by an arc or spark with a given capacitance charge is much greater than the amount of heat that can be generated in the previously described welding technique involving sustained pressure at the weld zone. With a given capacitor charge for the source, the current flow is also heavier in an arc discharge between the two filaments that are to be welded. The duration of the current peak is greatly shortened, however, with consequent less tendency to damage by heat or overload with respect to portions of the welded parts remote from the arc.

Apparently the bridging effect or displacement and migration of metal in an arc discharge between two pieces of metal is a transient phenomenon occurring in both flash welding and percussion welding but the amount of metal involved in the phenomenon is so minute relative to the cross-sectional areas of the metals as to be insignificant. In the discharge of a spark between two filaments of the small dimensions with which the present invention is concerned, however, the amount of metal involved in the bridging effect is relatively large in proportion to the dimensions of the filaments. Apparently the bridging effect or the tendency of metal to close the spark gap also involves other factors which are not too well understood at the present time.

There is reason to believe that one of these added factors may be surface tension taking effect in the brief interval of time in which the metal of the two filaments is in melted state. There is also the possibility that a helpful electromagnetic effect acting on the liquid metal is involved in the rise and decay of a magnetic field generated by the spark discharge. In other words, there may be an electromagnetic attraction between the filaments due to current flow during the discharge, preceded by an electrostatic attraction therebetween at the beginning of the discharge.

The welding technique of the invention, together with the objects of the invention and the features and advantages of the technique, will be more fully understood from the following description of specific practices together with the accompanying drawings.

In the drawings, which are to be regarded as merely illustrative:

Fig. 1 is a fragmentary plan view on a greatly enlarged scale showing a tap connection from a helically wound potentiometer extending through a peripheral hole in the potentiometer casing;

Fig. 2 is a transverse section taken as indicated by the line 2—2 of Fig. 1;

Figs. 3 and 4 are diagrammatic views indicating the successive steps in welding a straight tap wire to a coil in accord with the teachings of the invention;

Fig. 5 is a similar diagrammatic view indicating how the tap wire may be formed with a preliminary bend to make the tap wire L-shaped;

Fig. 6 is a diagrammatic view showing how a tap wire may be welded tangentially of a coil in situations where the coil is fully accessible;

Fig. 7 is a diagrammatic view showing how the tap wire may be bent to the form of a U in preparation for the weld;

Fig. 8 is a diagram of a similar procedure in which both legs of the U are made part of the welding circuit;

Figs. 9 and 10 are diagrammatic views indicating successive steps in the application of the invention to the welding of wires of exceedingly small diameter;

Fig. 11 is a diagrammatic view showing how the same basic technique may be used for a tangential weld on an exposed potentiometer coil;

Fig. 12 is a diagrammatic view showing how an auxiliary wire may be employed temporarily to apply the same basic technique to the welding of an exceedingly fine wire tap through a small casing hole;

Fig. 13 is a diagrammatic view illustrating a pressure weld technique employed prior to the invention; and Fig. 14 is a cross section on an enlarged scale of a portion of Fig. 13.

Figs. 1 and 2 show, by way of example, how a tap wire 20 is welded to one helical turn of a resistance wire 21 that is wound helically on a core wire 22 and is insulated from the core wire by a suitable nonconducting coating 23. The core wire may be either formed to a ring or formed to a helix. The potentiometer coil comprising the wire 21 wound on the wire core 22 is enclosed in a cylindrical casing 25 which casing has a peripheral hole 26 that is threaded, as shown, to receive a hollow terminal screw 27 having the usual diametrical kerf 28 for rotation by a screwdriver.

The terminal screw 27 engages and holds in place a terminal lug 30 having two inwardly turned flanges 31 engaged by the screw and two upstanding flanges 32 in which are the usual holes 33 to receive external connecting wires. The tap wire 20 is shown connected at its outer end to the outer face of the terminal screw 27 by means of a short cross wire 38. The bond is accomplished by placing the cross wire 38 across the end of the tap wire and then uniting the two with the terminal screw by a spot welding operation.

The next step after the stage represented by Figs. 1 and 2 is usually to seal the casing hole and at the same time to protect the tap wire. For example, the axial bore 39 in the terminal screw may be plugged in a suitable manner and then a quantity of molten solder may be applied to form a sealing layer over the outer end of the terminal screw 27 and to bond the terminal screw electrically to the terminal lug 30.

It will be readily understood, of course, that other constructions and fittings may be employed for the same purpose. For example, the terminal screw 27 or the terminal screw together with the terminal lug 30 may be replaced by a suitable metal eyelet or grommet-type fitting.

In Figs. 1 and 2, all dimensions are in correct proportion and the relatively small magnitude of the dimensions may be readily appreciated from the fact that the diameter of the tapped casing bore into which the screw 27 is threaded is approximately 0.104 inch as shown in Fig. 2. The diameter of the resistance wire 21 in this example is approximately .002 inch and the spacing between the helical turns of the wire is approximately .001 inch. A substantial proportion of the potentiometers that are tap welded by this method have casing holes smaller in diameter than the casing hole 26 and have resistance wires smaller in diameter than this particular resistance wire 21. The difficulties involved in making tap wire connections in such devices having these exceedingly small dimensions may be readily appreciated.

All of the diagrams Figs. 3 to 12 represent the employment of the same basic welding apparatus, which apparatus is characterized by the use of a capacitor 43 to store an electric charge for supplying the welding current. The capacitor may have a capacitance of 100 microfarads. The opposite sides of the capacitor 43 are connected to the two poles of a double pole double throw switch 44, which switch in one position connects the capacitor to a charging circuit and in its alternate position connects the capacitor to a welding circuit. The charging circuit represented by the block 45 is connected to two terminals of the switch 44, as indicated, and the other pair of terminals of the switch are connected to whatever welding circuit is required to carry out the welding procedure.

Preferably, the switch 44 is conveniently operated by remote control, for example, by a foot switch 48 in a control circuit 49 that includes a solenoid 50, or other electromagnetic means, for actuating the double throw switch 44. As indicated in Fig. 3, it is contemplated that when the foot switch 48 is closed, the double throw switch 44 will close the welding circuit.

Figs. 3 and 4 indicate, by way of example, how the method of the present invention may be used to weld the end of a straight tap wire 54 to the resistance wire 21, the resistance wire being formed in helical turns 55. In this instance, the helical wire 21 is accessible only through a peripheral aperture 26 in a cylindrical casing 25.

For the purpose of setting up a welding circuit, a conductor 58 connects the terminal of the double throw switch 44 associated with the positive side of the charge on the capacitor 43 with a suitable contact touching the helical resistance wire 21. The contact may be the usual wiper carried by the rotor of the potentiometer or may be a special contact incorporated in a welding jig. In Figs. 3 and 4, the contact or wiper indicated at 60 touches two adjacent helical turns of the resistance wire 21, as indicated diagrammatically, but the contact or wiper 60 may instead touch only one of the turns, as indicated in Fig. 5.

The required welding circuit may be completed by connecting the second or negative terminal of the double throw switch 44 with the straight tap wire 54 in any suitable manner. Preferably, a suitable holding device such as a pair of tweezers 61 is employed by the operator for handling the tap wire 54 in the course of the welding procedure and, as indicated in Figs. 3 and 4, the welding circuit may be completed simply by connecting the tweezers 61 with the terminal of the double throw switch 44 by a suitable conductor 62.

The preparation for the welding operation and the actual welding procedure are usually carried out with the aid of a microscope 65 trained on the helical turn 55 selected for the tap connection. In preparation for the weld and with the aid of the microscope 65 the operator scrapes the resistance wire 21 at the selected point to provide a small area of clean, bright metal and then steps on the foot switch 48 to connect the capacitor 43 with the welding circuit as indicated in Fig. 3. The operator then moves the tweezers by hand to advance the straight wire 54 slowly and accurately toward the selected weld point, both the advancing tip of the wire and the scraped area of the coil being visible under the microscope 65.

When the gap between the leading end of the straight wire 54 and the scraped resistance wire 21 narrows to a minute but appreciable distance, the condenser 43 discharges by means of a spark discharge across the gap and the desired weld is formed in an instantaneous manner without the necessity of further attention or the exercise of further skill on the part of the operator. As heretofore stated, in effect, the spark causes the molten metal to bridge the remaining gap between the straight wire 54 and the potentiometer coil. The bridging action can be demonstrated, for example, by immobilizing the wire 54 close to but out of electrical contact with the resistance wire 21 and then throwing the switch 44 to cause the spark discharge across the gap. It will be found that the gap will be effectively bridged with metal comparable in cross section to the cross section of the tap wire 54. Fig. 3 shows the position of the straight wire 54 prior to the spark discharge and Fig. 4 shows the weld completed by the discharge.

While the bridging phenomenon is not fully understood, there is reason to believe that certain factors may be involved in the phenomenon. In the first place, it is well known that metal particles migrate along the ionized path of an arc of the character and polarity of the described spark discharge. Ordinarily, such migration of metal would be of no significance because of the small quantity of metal involved but, in this instance, it is to be borne in mind that the metal parts being welded together are themselves exceedingly small in cross-sectional dimension. One fact to be given careful thought is that the metal involved, both on the part of the tap wire 54 and on the part of the resistance wire 21, is melted to liquid state even though the duration of that state is an exceedingly small fraction of a second. There is an opportunity, therefore, for surface tension to become an important factor. It is also to be borne in mind that the magnetic forces generated by current flow in the spark discharge have an opportunity to affect the metal when the metal is highly responsive because of its molten state. There is also reason to believe that the tap wire 54 actually elongates, apparently because of longitudinal electrostatic and/or electromagnetic forces in the direction of the spark gap that are effective while the main body of the wire is momentarily in plastic or semi-molten state. There is the further possibility that the closing of the gap by metal displacement is due to thermal expansion of the metal on opposite sides of the gap. Such expansion can be effective, of course, only across an extremely minute gap so that such expansion has this utility only in the small wire sizes with which the present invention is concerned.

A further consideration that should not be overlooked is that such a spark discharge causes current oscillation in an undamped manner at relatively high frequency, as is well known. The first pulse of the oscillation which is of dominating magnitude is in the direction of electron flow from the negative tap wire 54 to the positive resistance wire 21. In such exceedingly fine wires, the ratio between the surface area and the mass or volume of the wire per unit length is exceedingly high. This fact is important in accounting for the speed with which the metal cools to solidification. The whole cycle from initiation of the spark discharge to the completion of the weld as shown in Fig. 4 in the course of which the metal is melted and then cooled takes place in such a rapid and instantaneous manner that the transitory molten state cannot be observed even under the microscope.

As far as manipulation of the tap wire 54 by means of the tweezers 61 is concerned, the only movement that is significant in the completion of a successful weld is the movement of the tap wire 54 up to the point at which the spark discharge takes place. Whether the operator continues to move the tweezers in the direction to close the gap or whether the natural tremor of the operator's hand would tend to increase the gap after the spark discharge is of no significance because of the instantaneous character of the welding operation.

It is apparent from the foregoing discussion that the same basic welding procedure may be carried out by using mechanical means to move the tap wire 54 toward the resistance coil to the point of spark discharge and it is also apparent that a holding device with micrometer adjustment could be used to immobilize the wire 54 at a sparking distance from the resistance wire prior to operation of the foot switch 48 to connect the capacitor 43 with the welding circuit. Thus, the wire 54 may be placed in contact with the potentiometer coil and then withdrawn to form the gap. If a weak current is caused to flow between the wire 54 and the resistance wire 21 while the tap wire is in contact with the resistance wire, the formation of a minute gap by withdrawal of the tap wire 54 may be detected by observing an ammeter or the like energized by the weak current. The sudden drop in current would indicate breaking of the circuit by the gap and then the immobilized tap wire could be connected to the welding circuit and the foot switch 48 operated to carry out the welding operation.

The welding procedure illustrated by Fig. 5 is the same in all major respects as the procedure just described but, in this instance, the tap wire 68 is bent to the shape of an L to provide a short transverse terminal leg 69. The leg 69 may, for example, be approximately ½₂ inch long. A somewhat larger capacitance charge or welding current flow is used since there is apparently greater resistance to current flow between the two wires. It is believed that the oxide coating or foreign material on the leg 69, which is not removed in preparation for the weld, accounts for the higher resistance.

It has been found that the provision of the angular end leg 69 on the tap wire and the positioning of this end leg substantially parallel with the selected turn of the resistance wire 21 result in a stronger weld than the welding procedure of Figs. 3 and 4.

If the potentiometer coil is not enclosed by a cylindrical casing but is freely accessible from all directions, a weld of the same character as obtained in Fig. 5, can be obtained with a straight wire held as shown in Fig. 6. The end portion of the straight wire 70 in Fig. 6 is positioned relative to the resistance wire 21 in the same manner as the leg 69 of the tap wire in Fig. 5. When the straight wire 70 is moved laterally to narrow the gap, the same welding action will take place as in Fig. 5.

The purpose of Fig. 7 is to illustrate how the welding technique of the present invention may be employed in effect to weld two tap wires in one operation. The two separate wires then may be used in the potentiometer circuit to provide a tap connection having less resistance to current flow than a single wire. It will be noted in Fig. 7 that the tap wire 74 is bent to the form of an open U with somewhat divergent legs 75 and with a bottom or interconnecting portion 76 to serve the same function as the short leg 69 in Fig. 5. The welding operation is carried out in the same manner as heretofore described with reference to Fig. 5.

The purpose of Fig. 8 is to show how the welding procedure illustrated by Fig. 7 may be modified by using the tweezers 61 to grasp both legs 75 of the U-shaped tap wire. With this procedure, the welding current flows through both the legs 75 instead of through only one of the legs.

An important aspect of the welding procedure involving the spark discharge is that there is a minute explosive action caused, apparently, by the instantaneous generation of vapors, this explosive action serving a very useful purpose of removing corrosion and foreign material from the weld zone that would otherwise vitiate the weld metal. It has been found that this purging action can be used as a preliminary step in what may be conveniently termed a double spark weld procedure. The tap wire is first advanced toward the resistance coil to cause a spark discharge to remove impurities, which impurities preclude the formation of a weld. Immediately thereafter the operator again advances the tap wire to cause a second spark discharge to complete the weld, the capacitor having first been recharged. It has been found that while the first spark discharge does not form a weld, it does form a globule of clean, bright metal on the end of the tap wire to facilitate the formation of a weld by the second spark discharge.

It has been further discovered that the preliminary spark discharge in the above described double-spark weld procedure involves the transfer of metal from the tap wire to the resistance coil even though no weld is consummated, which metal is part of the above-mentioned globule on the resistance wire. This transfer of metal along with the instantaneous surface melting of the resistance coil wire is used to advantage in another technique which may be conveniently termed an alloy spotting procedure.

In this procedure, the first or preparatory spark discharge without the consummation of an actual weld is carried out by using a relatively small wire instead of the desired tap wire, which small wire has a composition for useful combination with the metal of the resistance coil. For example, the preliminary wire may be approximately 78% pure iron, approximately 5% aluminum and approximately 16% chromium and the resistance coil may be composed of approximately 55% copper and 45% nickel. In this instance, selected by way of example, it is contemplated that the final tap wire will be substantially pure nickel which is especially difficult to fuse with a resistance wire of such high copper content. The alloy produced at the weld point on the resistance wire by the preliminary spark discharge from a wire of high iron content will fuse very readily with a tap wire of high nickel content. For the second spark discharge, the desired nickel tap wire is substituted for the preliminary wire of high iron content and the second spark discharge forms an efficient weld with the nickel tap wire by virtue of the intermediate alloy produced by the first spark discharge.

This procedure may be used to weld a substantially pure nickel tap wire to a resistance coil having a copper content running as high as 90% or higher. A feature of this technique is that it may be used successfully when the disparity between the melting point of the tap wire and the melting point of the resistance coil wire is relatively great and would preclude the formation of an efficient weld without the preliminary spark alloying step.

The welding procedures of the invention described to this point have all related to the welding of tap wires ranging upward in diameter from .00175 inch or .0015 inch. The welding of tap wires smaller than .0015 inch diameter presents a problem since such wires are too small to withstand the amount of welding current required for a good joint. This problem is solved by positioning a tap wire in such manner that the tap wire prior to the welding operation extends in two directions from the welding zone with one portion or leg of the tap wire in the welding circuit and the other leg or portion out of the welding circuit. When spark discharge occurs, the leg or portion in the welding circuit melts away and the other leg or portion becomes the permanently welded tap wire. This procedure is illustrated by Figs. 9 and 10.

Preferably, the procedure illustrated in Figs. 9 and 10 is carried out by using a pair of tweezers 80 having the configuration shown to provide maximum visibility in the casing hole during the welding procedure. In this instance, the tap wire 81 is bent to a V to provide a leg 82 that is grasped by the tweezers 80 and a second leg 83 that becomes the final tap wire. The tweezers are placed, say, 1/32 to 1/16 inch from the vertex. The welding procedure is carried out in the same general manner as heretofore described, the apex of the V-shaped tap wire being advanced toward the resistance wire 21 until spark discharge occurs across the gap.

As a result of the instantaneous current flow caused by the spark discharge the relatively small diameter tap wire melts out in the welding circuit between the tweezers 80 and the apex of the tap wire V at the weld point. The metal that is melted out between the point of engagement by the tweezers and the weld point flows instantaneously to the weld point to build up a globule of metal that makes an exceptionally strong joint. The result is permanent welding of the second leg 83 to the resistance wire 21, as may be seen in Fig. 10.

It is a surprising fact that the leg 83 need not be supported at all and this fact indicates how rapidly the metal cools at the weld and apparently also indicates that some kind of adhesive action occurs while the metal is in liquid state, perhaps an adhesive effect caused by surface tension.

The purpose of Fig. 11 is to indicate how the same process as illustrated by Figs. 9 and 10 may be carried out without bending the tap wire. This variation of the procedure may be used, for example, when the resistance wire 21 is freely accessible. In this instance a straight tap wire 86 is grasped near its end by a pair of tweezers 61 with the tap wire extending in both directions across the desired weld point on the resistance wire 21. Thus, in effect the wire 86 has two legs relative to the desired weld point, the tweezers 61 being considered as engaging a short leg, say a leg one sixteenth of an inch long on one side of the weld point and the leg 86 extending on the other side of the weld point. When the tweezers 61 move the wire 86 laterally to cause spark discharge at the weld point, the straight wire being tangential to the coil 21, the resulting spark discharge melts out the short leg that is in the welding circuit leaving the leg 86 as the permanent tap wire.

Fig. 12 illustrates how the welding procedure illustrated by Figs. 9 and 10 may be applied to the problem of making a tap weld at a point of difficult accessibility, in this instance accessibility being difficult because the resistance wire 21 is in a thick walled casing 87 and may be reached only through a casing hole 88 of relatively small diameter.

The welding operation is carried out with the aid of a temporary wire 89 of somewhat larger diameter than the tap wire 90. In preparation for the welding operation, the tap wire 90 is bent to a V with a relatively short leg 91 and a relatively long leg 92. The end of the short leg 91 is then welded to the end of the temporary wire 89 by the spark welding technique so that the temporary wire 89 may be used as a tool or holding device for carrying out the welding operation. As shown in Fig. 12, the temporary wire 89 may be grasped by a pair of tweezers 61, the tweezers completing the welding circuit and being used to move the tap wire toward the resistance wire 21. The temporary wire 89 is selected for low resistance and high current-carrying capacity as well as for good weldability with respect to the tap wire 90. When the spark discharge occurs, the relatively short leg 91 melts away as heretofore described.

The features and advantages of the described welding techniques may be understood by referring in more detail to the previously mentioned pressure welding procedure practiced prior to this invention as illustrated in Figs. 13 and 14. In this prior procedure a glass tube 100 reduced to capillary dimensions at its operating end, as shown at 101, is provided with an external conductor that is adapted to hold a tap wire against the periphery of the glass tube. In the construction shown the external conductor comprises a collar 102 which carries a forwardly extending spring clip 103. The operating end of the glass tube 100 is ground to a relatively sharp bevel as best shown in Fig. 14.

In preparation for the welding operation a piece of wire 104 to be used for the tap wire is formed as best shown in Fig. 14 with one leg 105 of the wire extending into the glass tube 100 and the other leg 106 engaged by the spring clip 103. With the capacitor 43 connected by the double throw switch 44 with the charging circuit 45, a conductor 58 is used to form one side of the welding circuit as heretofore described and a second conductor 107 is connected to the collar 102 to form the other side of the welding circuit. The operator then uses the glass tube 100 to press the bent tap wire firmly against the resistance wire 21 with sustained pressure and while maintaining the pressure steps on the foot switch 48 to connect the charged capacitor 43 into the welding circuit. The resulting surge of current causes the metal of the wire 104 and the resistance wire 21 to become sufficiently plastic to fuse together under the weld pressure. The surge of current melts out the leg of wire 106 between the weld point and the clip 103, the melted metal flowing into the weld zone. Thus the leg 105 inside the glass tube 100 becomes the permanent tap wire.

The disadvantages of the welding procedure illustrated by Figs. 13 and 14 as heretofore enumerated may be readily appreciated. A further disadvantage heretofore not mentioned is that the pressure required to make the weld has a tendency to cause the tap wire 104 to slip to one side or the other because of the pointed end of the glass tube. Whenever such displacement occurs, the operator must stop to readjust the tap wire before carrying out the welding operation.

With reference to production costs, the new welding procedure may be carried out with considerable saving in time and without undue strain on the part of the operator. For example, it may require as long as twelve minutes to carry out a given welding operation in the manner indicated by Figs. 13 and 14, whereas the same welding operation may be carried out with the techniques of this invention in less than four minutes.

With respect to the finished potentiometer, however, the most striking advantage of the invention is in the use of larger tap wire sizes than possible with the procedure shown in Figs. 13 and 14. For resistance coil wire diameters ranging upward from .00175 inch, the welding techniques illustrated by Figs. 3 to 6 may be employed to weld thereto tap wires of the same diameter as the resistance wire. In contrast, smaller diameter tap wires must be used in the older pressure welding technique of Figs. 13 and 14. Thus, coil wire diameters and tap wire diameters used in the older pressure welding method with welding current from the discharge of a capacitance of 100 microfarads range as follows:

| Coil wire diameter | Tap wire diameter |
| --- | --- |
| 5.0 | 2.75 |
| 4.0 | 2.75 |
| 3.5 | 2.75 |
| 3.1 | 2.5 |
| 2.75 | 2.25 |
| 2.5 | 2.0 |
| 2.25 | 1.75 |
| 2.0 | 1.5 |
| 1.75 | 1.4 |

For resistance wire diameters ranging downward from .00175 inch, the welding techniques illustrated by Figs. 9 to 12 may be used to attach tap wires that are only one size below the diameter of the corresponding resistance wires, whereas tap wires two sizes smaller than the corresponding resistance wires must be used in the pressure welding technique exemplified by Figs 13 and 14. The following tabulation brings out the contrast in this wire range.

| Present methods | | Prior art | |
| --- | --- | --- | --- |
| Coil wire diameter | Tap wire diameter | Coil wire diameter | Tap wire diameter |
| 1.75 | 1.5 | 1.75 | 1.4 |
| 1.5 | 1.4 | 1.5 | 1.3 |
| 1.4 | 1.3 | 1.4 | 1.2 |
| 1.3 | 1.2 | 1.3 | 1.1 |
| 1.2 | 1.1 | 1.2 | 1.0 |
| 1.1 | 1.0 | 1.1 | .9 |
| 1.0 | .9 | 1.0 | .8 |
| .9 | .8 | .9 | .7 |

A further striking fact in comparing the newer and older welding techniques is the fact that using the same capacitance for a current source in each instance, less of a capacitor charge for a given size tap wire is required in the new technique. This fact is brought out by the following tabulation:

| Prior art | | | Present method | | |
| --- | --- | --- | --- | --- | --- |
| Coil wire diameter | Tap wire diameter | Volts charge on 100 Mfd. | Coil wire diameter | Tap wire diameter | Volts charge on 100 Mfd. |
| 5.0 | 2.75 | 55.0 | 5.0 | 5.0 | 44.5 |
| 4.0 | 2.75 | 55.0 | 4.0 | 4.0 | 38.5 |
| 3.5 | 2.75 | 55.0 | 3.5 | 3.5 | 35.5 |
| 3.1 | 2.5 | 50.0 | 3.1 | 3.1 | 33.5 |
| 2.75 | 2.25 | 40.0 | 2.75 | 2.75 | 31.5 |
| 2.5 | 2.0 | 37.0 | 2.5 | 2.5 | 30.0 |
| 2.25 | 1.75 | 35.0 | 2.25 | 2.25 | 28.5 |
| 2.0 | 1.5 | 32.0 | 2.0 | 2.0 | 27.0 |
| 1.75 | 1.4 | 28.0 | 1.75 | 1.75 | 26.5 |
| 1.5 | 1.3 | 25.0 | 1.5 | 1.4 | 25.0 |
| 1.4 | 1.2 | 24.0 | 1.4 | 1.3 | 23.0 |
| 1.3 | 1.1 | 23.0 | 1.3 | 1.2 | 22.0 |
| 1.2 | 1.0 | 22.0 | 1.2 | 1.1 | 20.5 |
| 1.1 | .9 | 21.0 | 1.1 | 1.0 | 19.0 |
| 1.0 | .8 | 20.0 | 1.0 | .9 | 17.5 |
| .9 | .7 | 19.0 | .9 | .8 | 16.0 |

It is apparent from the foregoing tabulations that the new welding technique makes a given weld with substantially less current than necessary in the older pressure procedure. One reason for the difference is that the technique relies primarily on the spark to provide the welding heat, whereas the older technique relies on the resistance of the wires and a substantial portion of the heat generated by such resistance is dissipated by the closely contiguous mass of the glass tube.

My description in specific detail of particular practices of the invention, for the purpose of illustration and to exemplifiy the underlying basic principles, will suggest to those skilled in the art various changes, substitutions and other departures from my disclosure that may be made within the spirit and scope of the appended claims.

This application is a division of application Serial No. 302,023 filed July 31, 1952.

I claim as my invention:

1. A method of welding together two small metal filaments in or near the range of sizes in which the aid of optical magnification is desirable for quantity production, which method includes the steps of: moving one filament forwardly toward the other until they are in physical contact; then separating said filaments a slight distance sufficient only to form a minute gap between the previously-engaged zones of the filaments; and then discharging through said gap a capacitor charged at a potential greater than the breakdown potential of said gap to establish a spark in said gap of sufficient intensity to weld the filaments together.

2. A method as defined in claim 1 in which the charged capacitor is electrically connected between said filaments after said minute gap has been formed.

3. A method of welding together two small metal filaments in or near the range of sizes in which the aid of optical magnification is desirable for quantity production, which method includes the steps of: moving one filament forwardly toward the other while there exists therebetween a small difference in potential, said movement continuing until there is a small but measurable current flow between said filaments as a result of electrical contact therebetween; then separating said filaments only sufficient to interrupt said current flow and produce a minute gap between the previously-engaged zones of the filaments; and then discharging a charged capacitor through said gap and thereby establishing a spark in the gap of sufficient intensity to result in a welding together of the filaments.

4. A method of welding together two small metal filaments in or near the range of sizes in which the aid of optical magnification is desirable for quantity production, which method includes the steps of: establishing a first voltage difference between said filaments from a first source of potential connected in series circuit to said filaments through a current-responsive device in such series circuit; moving one filament forwardly toward the other until said current-responsive device indicates closing of said series circuit and current flow therethrough; separating said filaments only sufficient to interrupt said current flow as indicated by said current-responsive device, thus forming a minute gap between said filaments; and then establishing a second voltage difference between said filaments sufficient to create a filament-welding spark in said minute gap.

5. A method of welding together two small metal filaments in or near the range of sizes in which the aid of optical magnification is desirable for quantity production, which method includes the steps of: immobilizing said filaments with the selected weld points thereon spaced only sufficient to be out of electrical contact with each other thereby forming a minute gap therebetween; and then discharging across said minute gap a charged capacitor charged with a voltage sufficient to create a spark in said gap and weld said filaments together.

6. A method as defined in claim 5 involving the use of a holding device and including the steps of connecting said holding device to one filament at a position spaced a small distance away from the desired weld point of such filament to leave an otherwise unsupported portion of such filament between such position and such weld point, and immobilizing such one filament relative to the other filament through said holding device to form said minute gap.

References Cited in the file of this patent

UNITED STATES PATENTS

| | | |
|---|---|---|
| 1,736,811 | Wysocki | Nov. 26, 1929 |
| 2,159,916 | Vang | May 23, 1935 |
| 2,279,316 | Herzog | Apr. 14, 1942 |